United States Patent
Plush et al.

(10) Patent No.: US 6,789,383 B1
(45) Date of Patent: Sep. 14, 2004

(54) CHAIN FOR CARRYING HOSE OR CABLE

(75) Inventors: Brian William Plush, Berkley Vale (AU); Philip William Tyler, Leumeah (AU); Ben Lewis, Valley Heights (AU)

(73) Assignee: Senior Thermal Engineering Australia PTY Limited, New South Wales (AU)

( * ) Notice: Subject to any disclaimer, the term of this patent is extended or adjusted under 35 U.S.C. 154(b) by 0 days.

(21) Appl. No.: 10/111,068

(22) PCT Filed: Oct. 16, 2000

(86) PCT No.: PCT/AU00/01257
§ 371 (c)(1),
(2), (4) Date: Aug. 26, 2002

(87) PCT Pub. No.: WO01/29448
PCT Pub. Date: Apr. 26, 2001

(30) Foreign Application Priority Data

Oct. 18, 1999 (AU) .............................................. PQ3503

(51) Int. Cl.[7] .............................................. F16G 13/16
(52) U.S. Cl. .............................. 59/78.1; 59/900; 248/49
(58) Field of Search .............................. 59/78.1; 248/49, 248/51

(56) References Cited

U.S. PATENT DOCUMENTS

| 4,800,714 A | * | 1/1989 | Moritz | 59/78.1 |
| 4,807,432 A | | 2/1989 | Mauri | 59/78.1 |
| 4,833,876 A | | 5/1989 | Kitao et al. | 59/78.1 |
| 4,885,908 A | * | 12/1989 | Stohr | 59/78.1 |
| 5,163,281 A | | 11/1992 | Kanehira et al. | 59/78.1 |
| 5,220,779 A | | 6/1993 | Tatsuta et al. | 59/78.1 |
| RE35,579 E | * | 8/1997 | Moritz et al. | 59/78.1 |
| 6,029,437 A | | 2/2000 | Hart | 59/78 |

FOREIGN PATENT DOCUMENTS

EP 0 308 958 A2 3/1989

* cited by examiner

Primary Examiner—David Jones
(74) Attorney, Agent, or Firm—Gordon & Jacobson, PC (57) ABSTRACT

A chain for carrying hose or cable, typically in an underground mine. The chain includes interconnected links. Each link includes a top wall, a bottom wall, and a pair of laterally opposed side wall. Each side wall has a pair of pivot connectors for articulated interconnection of the link with an adjoining link of the chain. The top and/or bottom walls can be detached from the side walls in a direction away from each other to provide access to a cable/hose receiving passage bound by all four walls.

42 Claims, 6 Drawing Sheets

CHAIN FOR CARRYING HOSE OR CABLE

BACKGROUND OF THE INVENTION

1. Field of the Invention

The following invention relates to a chain for carrying hose or cable, typically in an underground mine. The cable might be an electrical cable, whereas the hose might be a flexible hydraulic or pneumatic hose. The cable and/or hose pass through a length of articulated chain links. At least a portion of the chain generally resides within an open-topped channel restricting side access to the chain links.

2. State of the Art

Some known handling chains have open sides providing access to the cable or hose for maintenance and other purposes.

Other known chains comprise linkages having both top and bottom walls and a pair of opposed side walls which laterally define an enclosed cavity through which the cables or hoses pass. One such known system is disclosed in Australian patent application No. 92344/98 which discloses a chain comprising individual links having removable side walls.

In a relatively narrow open-topped channel within which the chains often reside, there is little access to the side walls to remove the same. It is therefore common practice to lift the chain from the channel to gain access to the side walls. It would be far more appropriate to remove a top wall and/or bottom wall to gain access to the interior of the individual chain links. It would also be desirable to provide a chain link structure wherein the top wall is removable in a substantially vertical direction (in a direction away from the bottom of the open-topped channel upon which the chain is support. This is unlike the conventional side-removal/insertion technique for cables or hoses that is known and for which the chain of Australian patent application No. 93244/98 is designed.

It is the object of the present invention to overcome or substantially ameliorate the above disadvantage and/or more generally to provide an improved chain for carrying hose or cable.

SUMMARY OF THE INVENTION

There is disclosed herein a link for a chain for carrying hose or cable, comprising:
a top wall,
a bottom wall,
a pair of side walls fixed to respective opposed lateral ends of the top and bottom walls to define a cable/hose receiving passage bound by all four walls, each side wall having a pair of pivot connector at respective longitudinal ends thereof for articulated interconnection of the link with an adjoining link of the chain, wherein
the top and/or bottom walls can be detached from the side walls in a direction away from each other to provide access to said cable/hose receiving passage.

Preferably the top and bottom walls are identical.
Preferably the side walls are identical.
Preferably each side wall includes an internally located, longitudinally extending reinforcing member at respective longitudinally opposed ends of which said pivot connectors are provided.
Preferably the top and bottom walls each comprise a pair of curved corner features to provide a smooth transition to an inner surface of the respective side walls.

Preferably said bottom and top walls are attached to the respective side walls by dovetail interconnection means.
Preferably the top and bottom walls are secured to their respective side walls by means of a pivotable key member.
Preferably each chain link comprises a pair of said key members.
Preferably each key member passes vertically through a side wall and the respective dovetail interconnection between that side wall and each of the top and bottom walls.
Preferably each said longitudinally extending reinforcing member comprises a pair of sub-members in back-to-back configuration, a first portion of the reinforcing member having said sub-members engaging each other and a second portion having the sub-members spaced apart and parallel.
Preferably the pivotable key member passes between the spaced apart portions of the reinforcing member sub-members.
Preferably each pivotable key member has an exposed end associated with a recess in the respective top or bottom wall.
Preferably the exposed portions of the key members each include a bent-over portion extending substantially normally from the main longitudinal extent of the key member.
Preferably useable with the pivotable key members is a locking tool adapted to fit over the bent-over portions of the respective key members so as to reorientate the key members into one of several orientations, a first of which releases the top wall and bottom wall from the respective side wall, a second of which locks the top and bottom walls to the respective side wall, and a third of which locks one of the top or bottom wall and unlocks the other of the bottom or top wall from the respective side wall. As an alternative to the provision of a locking key member, a bolt and nut arrangement for example might be provided.

BRIEF DESCRIPTION OF THE DRAWINGS

A preferred form of the present invention will now be described by way of example with reference to the accompanying drawings wherein.

DESCRIPTION OF THE PREFERRED EMBODIMENT

Figure 1:
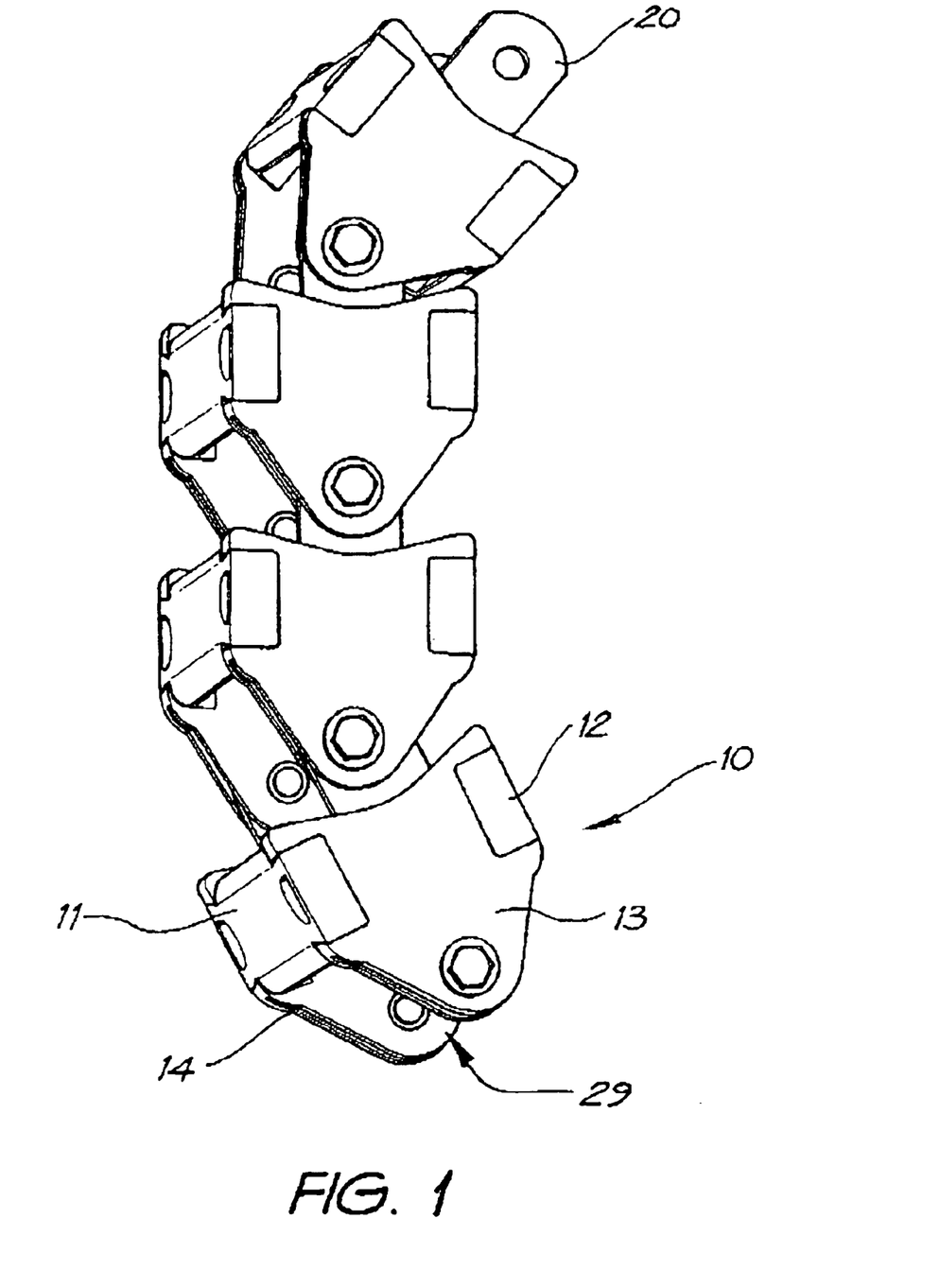
FIG. 1 is a schematic perspective view of three links of a chain for carrying hose or cable.

In the accompanying drawing there is schematically depicted the components of an individual chain link 10. Three such chain links 10 are shown interconnected to form a segment of a chain in FIG. 1.

Each link 10 comprises a top wall 11, a bottom wall 12 and a pair of laterally opposed side walls 13 and 14. These components are typically fabricated from high strength, abrasive-resistant plastics material or metal. The top wall 11, bottom wall 12 and side walls 13, 14 interconnect to form a cable/hose receiving passage 29. The chain typically sits and/or rides along an open-topped channel. That is, access to the chain is generally from above.

Figure 2:
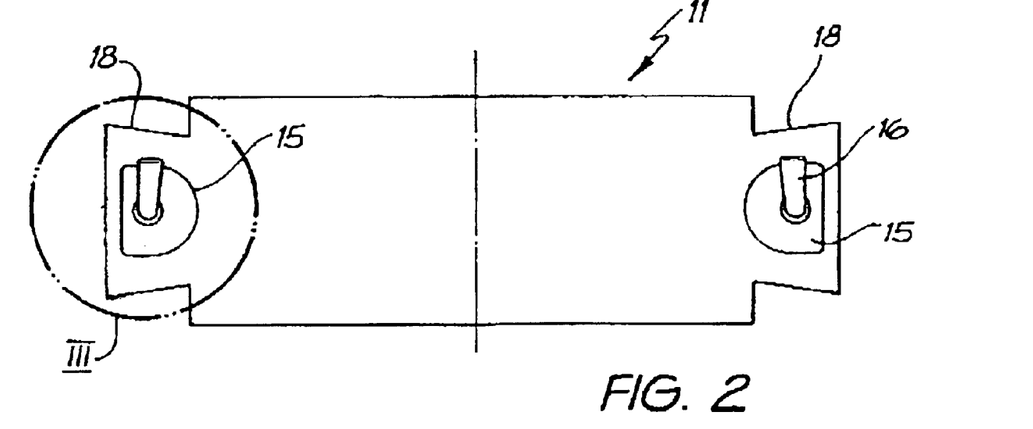
FIG. 2 is a schematic plan view of a top wall of a chain link.
Figure 16:
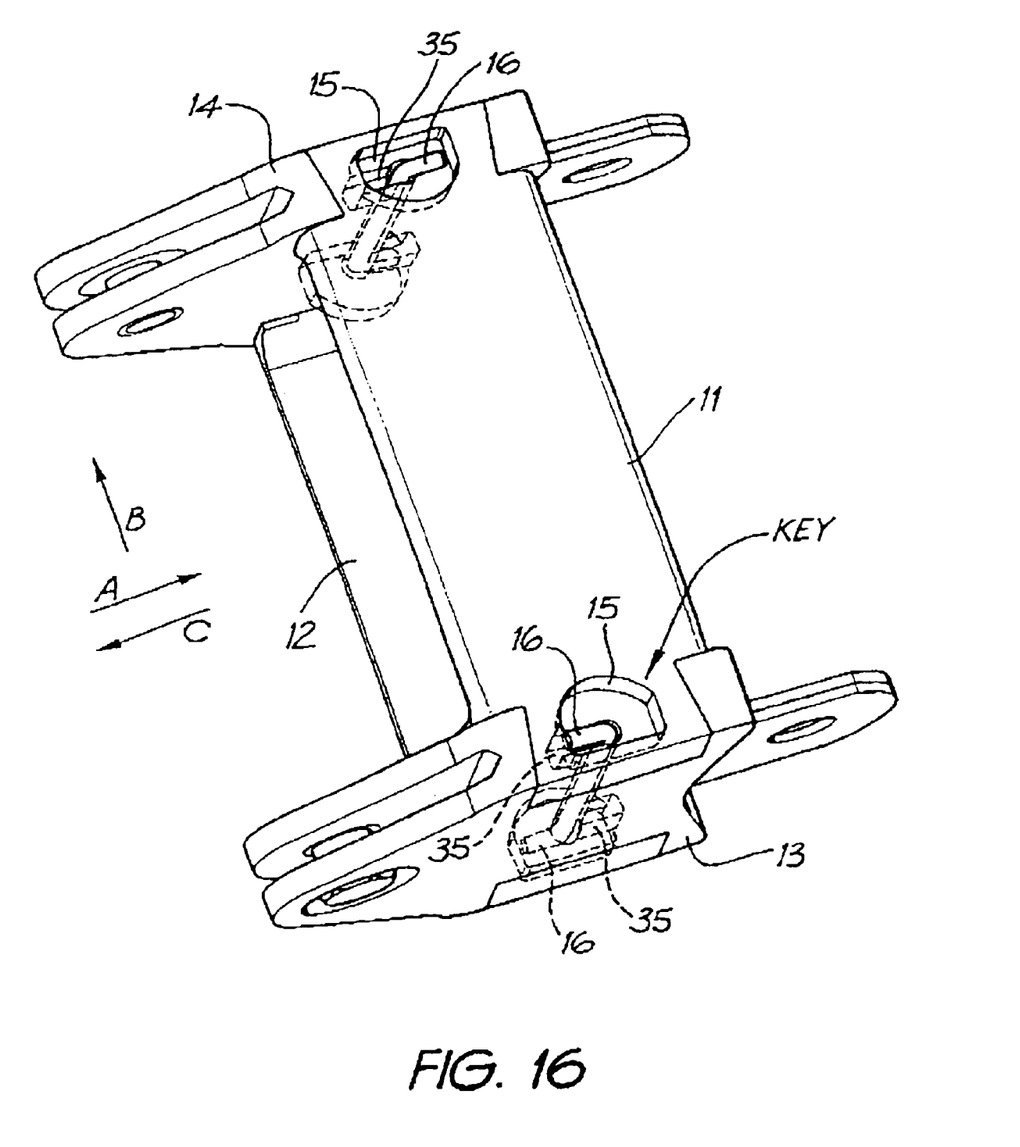
FIG. 16 is a schematic perspective view of a chain link.

In FIG. 2 the top wall 11 is shown. The top wall includes a pair of laterally opposed dovetail connector 18 into the upper surface of which there is provided a recess 15. A key member 16 having upper and lower bent-over portions fits within the respective side walls such that the bent-over portions reside within the respective recess 15. The association of the recess 15 with the key member 16 is best depicted in FIG. 16. Each recess 15 includes a through-slot 35 through which the bent-over portion of the key member 16 might pass if the key member were appropriately orientated. For the sake of simplicity of description, reference is now made to the bent-over portion 16 of the key member indicated by the word "KEY" in FIG. 16. At this position, should the leg of key 16 be oriented in the direction indicated by arrow B, both the upper and lower walls of the chain link will be secured to the side wall 13. If the bent-over portion of the key 16 faces in the direction indicated by arrow A (ie. as depicted), then the top wall 11 is free to lift off the side wall 13 whereas the bottom wall 12 is fixed. That is, the bent-over portion 16 will pass through the through-slot 35 provided beneath the recess 15 of the top wall 11. The lower bent-over portion of the key is angled away from the slot 35 at the bottom wall and therefore the bottom wall is retained. With the bent-over portion facing the direction indicated by arrow C, the to wall 11 will be retained, whereas the bottom wall 12 is capable of being detached from the side wall 13. In order to maintain a firm interengagement of the top wall and bottom wall with the respective side wall, the length of the key member should be such as to ensure tight engagement of the bent-over portion with the bottom of the respective recesses.

In the fixed, in use configuration wherein all walls are securely attached, the bent-over portions of one key will face laterally the link to the bent-over portions of the other key.

Figure 4:
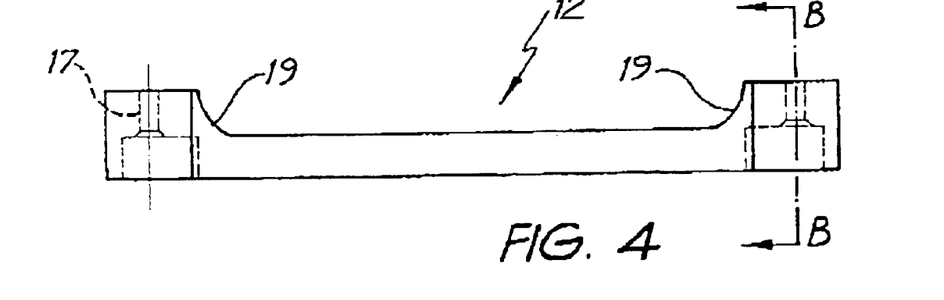
FIG. 4 is a schematic elevational view of a bottom wall.
Figure 4B:
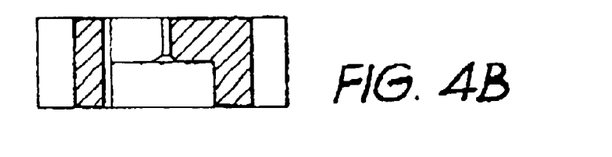
FIG. 4B is a schematic cross-sectional elevational view taken at B—B in FIG. 4.

In FIG. 4, the bottom wall 12 is shown to have on its upper (inwardly facing) surface a pair of opposed curved corner features 19 providing a smooth transition to the internal surface of the respective side walls 13, 14 once assembled.

Each of the recesses 15 has extending downwardly therefrom a hole 17 through which the substantially cylindrical shaft portion of the respective key member passes.

Figure 5:
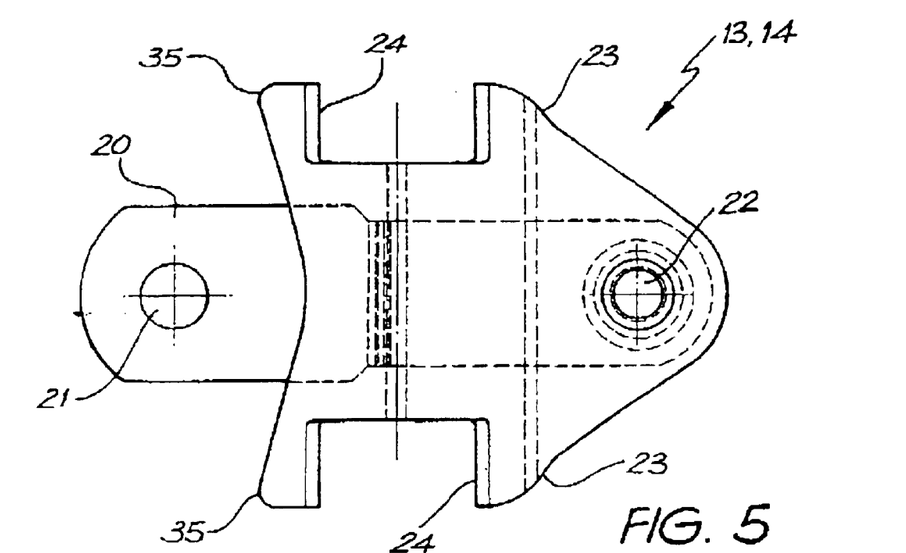
FIG. 5 is a schematic elevational view of a side wall.

In FIG. 5 one of the side walls 13, 14 is depicted.

Each side wall 13, 14 includes an upper and lower dovetail recess 24 into which the protruding dovetails 18 of the respective top and bottom walls can be received.

Moulded within the side walls 13, 14 is a reinforcing member 20, one end of which is exposed from the side wall to present a pivot hole 21. At the other end of the reinforcing member 20 there is provide another pivot hole 22 coinciding with a hole passing through the side wall. This end portion of the reinforcing member 20 does not extend beyond the structure of the side wall. In use, when the chain links are articulated, the hole 21 of one reinforcing member 20 is aligned with hole 22 in another and a short pivot pin or shaft extends therethrough.

To limit the degree of pivotal articulation between adjoining chain links, a pair of buffer surfaces 23 are provide against which the corresponding buffer surfaces 35 of an adjoining link can abut.

Figure 6:
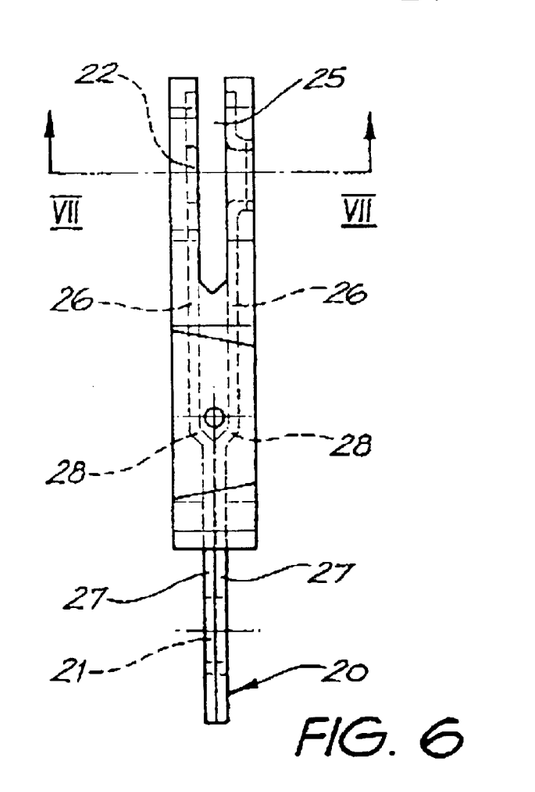
FIG. 6 is a schematic plan view of the sidewall of FIG. 5.
Figure 7:
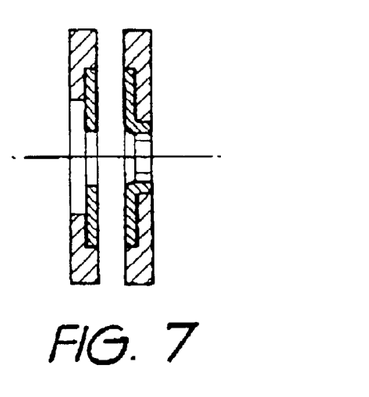
FIG. 7 is a schematic cross-sectional elevational view taken at VII—VII of FIG. 6.
Figure 8:
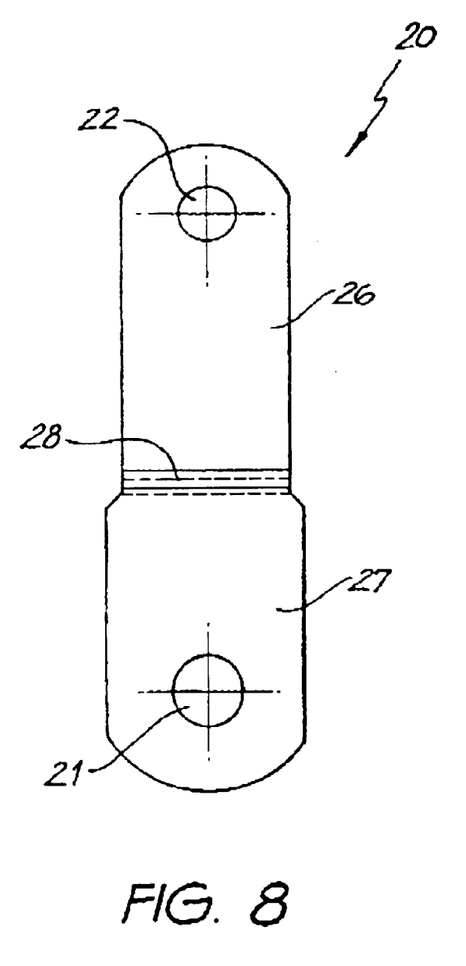
FIG. 8 is a schematic elevational view of a sub-member, two of which form a reinforcing member.
Figure 9:
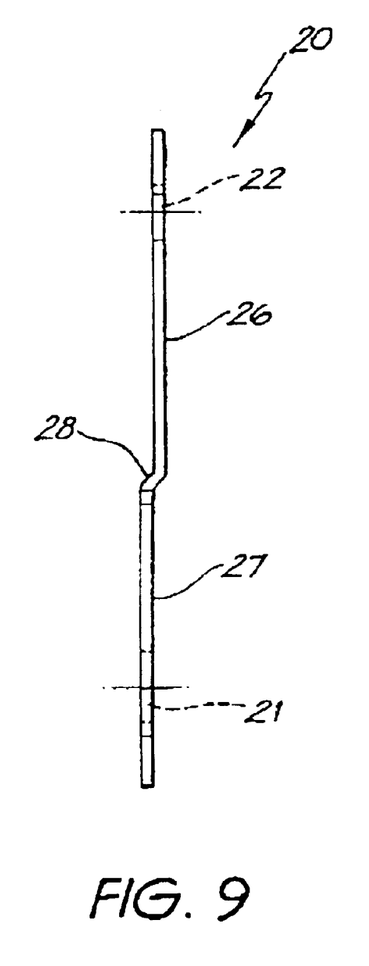
FIG. 9 is a schematic plan view of the sub-member of FIG. 8.
Figure 10:
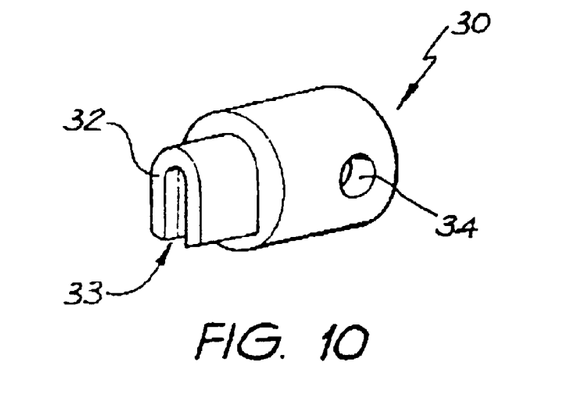
FIG. 10 is a schematic perspective view of a tool useable with a locking key to lock and/or unlock the top and/or bottom walls from the side walls of the chain links.
Figure 11:
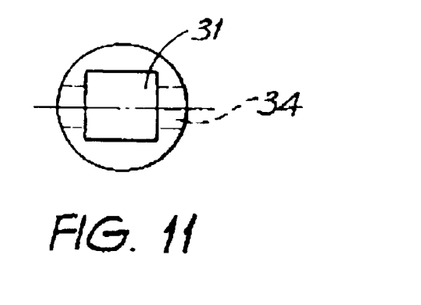
FIG. 11 is a schematic rear elevational of the tool of FIG. 10.
Figure 12:
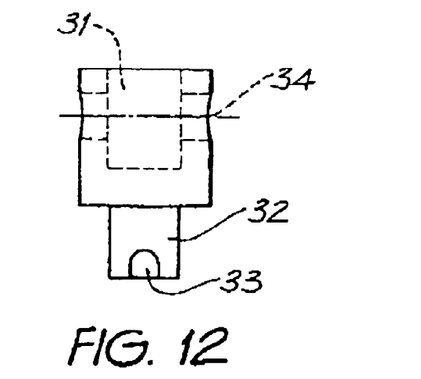
FIG. 12 is a schematic inverted plan view of the tool of FIG. 10.
Figure 13:
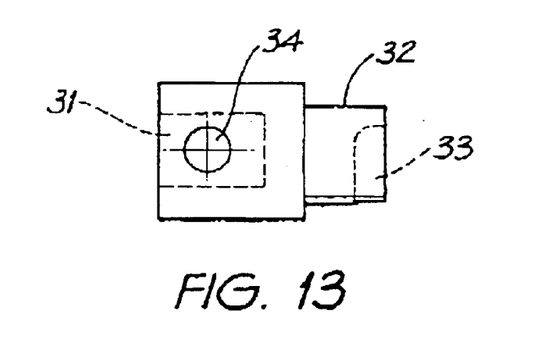
FIG. 13 is a schematic elevational view of the tool of FIG. 10.
Figure 14:
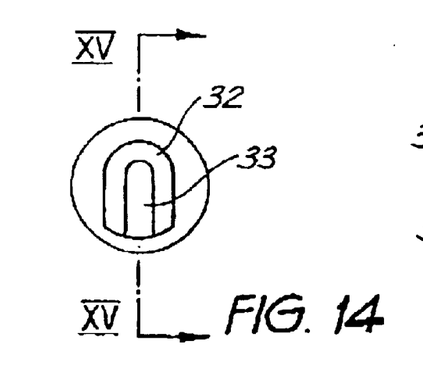
FIG. 14 is a schematic front elevational view of the tool of FIG. 10.
Figure 15:
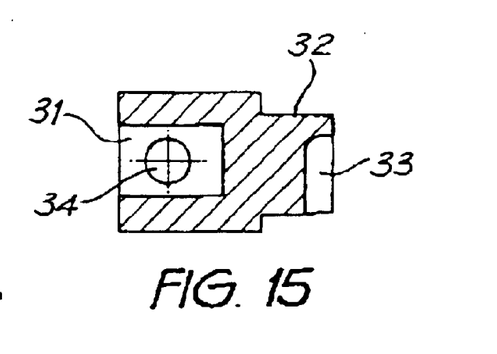
FIG. 15 is a schematic cross-sectional elevational view taken at XV—XV in FIG. 14.

As shown in FIG. 6, a reinforcing member comprises a pair of back-to-back sub-members, one of which is shown in FIGS. 8 and 9. The sub-members for the sake of convenient description can be separated into two portions 26 and 27. Portions 26 are spaced apart by a space 25 to receive the engaging portions 27 of a reinforcing member of the adjoining chain link. The engaging portions 27 extend out of the end of the side wall as shown in FIG. 5, whereas the spaced apart portions 26 do not protrude. Portions 26 and 27 are delimited by a deflection 28 shown in FIG. 9.

In FIG. 6, the straight shaft portion of the key member 16 is shown positioned between the spaced apart portions 26 alongside the respective deflections 28.

Figure 3:
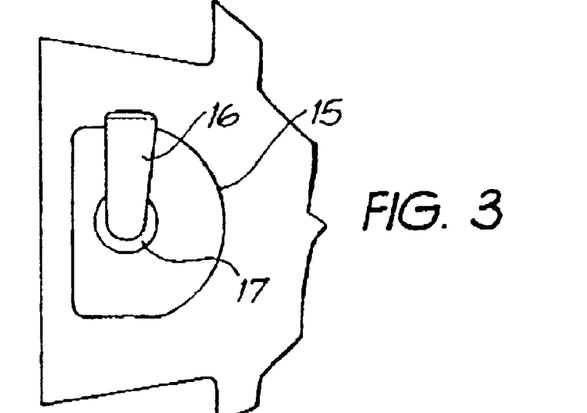
FIG. 3 is a schematic detailed plan view of the portion indicated by III in FIG. 2.

FIGS. 10 to 15 depict a tool 30 used to rotate the pivotable key member 16. The tool 30 includes a square recess 31 to receive the protrusion of a socket tool and a transversely extending aperture 34 which might alternatively be engaged by the shaft of a screwdriver for example. Protruding from the other end of the tool 30 is a U-shaped engaging element 32 having a recess 33 therein sized and shaped to receive the bent-over leg portion of the key member 16 shown in FIG. 3. The key member can pivot throughout 360° and be provided with recesses or protrusions which interengage with the dovetail protrusions of the top and bottom walls to selectively lock and unlock the top and bottom walls from the side walls.

The design of the dovetail interconnection is such as to allow only vertical removal of the top and/or bottom walls so as to gain access to the passage 29. Depending on the orientation of the key member 16, the top and bottom walls might be locked to the side walls, both the top and bottom walls might be unlocked from the side walls, or one or the other of the top and bottom walls might be locked (with the other unlocked) from the respective side wall. A simple turn of the key member 16 to a particular angular orientation will allow the desired disassembly of the components.

As the chain generally resides in use within an open-topped channel, the most convenient means of access to the passage 29 is by removal of the top wall 11. This contrast favorably with other known systems where the chains links must be lifted sideways to gain access to a side wall.

It should be appreciated that modifications and alteration obvious to those skilled in the art are not to be considered as beyond the scope of the present invention. For example, rather than providing the dovetail interengagement feature, a number of vertical dowels might be provided. Furthermore, rather than providing the pivotable key member, nuts and bolts could be provided.

What is claimed is:

1. A link for a chain for carrying hose or cable, comprising:
   a top wall,
   a bottom wall,
   a pair of side walls fixed to respective opposed lateral ends of the top and bottom walls to define a cable/hose receiving passage bound by all four walls, each side wall having a pair of pivot connectors at respective longitudinal ends thereof for articulated interconnection of the link with an adjoining link of chain, wherein at least one of the top and bottom walls can be detached from the sidewalls in a direction away from each other to provide access to said cable/hose receiving passage, and wherein said at least one of the top and bottom walls includes an outer surface and is secured to a respective side wall by a pivotable key member, the key member being operable by an access recess in the outer surface of said at least one of the top and bottom walls, said access recess having a passageway therein that extends through said at least one of the top and bottom walls, the passageway adapted to retain the key member in the access recess when the key member is misaligned with the passageway to thereby lock said at least one of the top wall and bottom walls to the respective side wall, and the passageway adapted to allow the key member to pass therethrough when the key member is aligned with the passageway to thereby unlock said at least one of the top wall and bottom walls from the respective side wall.

2. The link of claim 1 wherein the top and bottom walls are identical.

3. The link of claim 1 wherein the side walls are identical.

4. The link of claim 1 wherein each side wall includes an internally located, longitudinally extending reinforcing member at respective longitudinally opposed ends of which said pivot connectors are provided.

5. The link of claim 1 wherein the side walls each have an inner surface and the top and bottom walls each comprise a pair of curved corner features that provide a smooth transition to the inner surface of the respective side walls.

6. The link of claim 1 wherein said bottom and top walls are attached to respective walls by dovetail interconnection means.

7. The link of claim 1 wherein each chain link comprises a pair of said key members.

8. The link of claim 7 wherein each key member passes through a side wall and the dovetail interconnection between that side wall and each of said top and bottom walls.

9. The link of claim 4 wherein each said longitudinally extending reinforcing member comprises a pair of sub-members in back-to-back configuration, a first portion of the reinforcing member having said sub-members engaging each other and a second portion having the sub-members spaced apart and parallel.

10. The link of claim 9 wherein the top and bottom walls are secured to their respective side walls by means of a pivotable key member passing between the spaced apart portions of the reinforcing member sub-members.

11. The link of claim 7 wherein each pivotable key member has an exposed end associated with a recess in the respective top or bottom wall and a longitudinal extending portion.

12. The link of claim 11 wherein the exposed portions of the key members each include a bent-over portion extending normally from the longitudinal extending portion of the key member.

13. The link of claim 12 and a locking tool adapted to fit over the bent-over portion of the respective key members so as to reorientate the key members into at least one of several orientations, a first of which releases the top wall and bottom wall from the respective side wall, a second orientation of which locks the top and bottom walls to the respective side walls, and a third of which locks one of the top or bottom wall and unlocks the other of the bottom or top wall from the respective side wall.

14. A link for a chain for carrying hose or cable, comprising:

a top wall, a bottom wall, a pair of side walls fixed to respective opposed lateral ends of the top and bottom walls to define a cable/hose receiving passage bound by all four walls, each side wall having a pair of pivot connectors at respective longitudinal ends thereof for articulated interconnection of the link with an adjoining link of the chain;

wherein at least one of said bottom and top walls are attached to the respective side walls by dovetail interconnection means, said at least one of the top and bottom walls can be detached from the side walls in a direction away from each other to provide access to said cable/hose receiving passage, and said at least one of the top and bottom walls is releasably secured to their respective side walls by means of a pivotable key member.

15. The link of claim 14 wherein said at least one of the top and bottom walls includes an outer surface with an access recess, said access recess having a passageway therein that extends through said at least one of the top and bottom walls, the passageway adapted to retain the key member in the access recess when the key member is misaligned with the passageway to thereby lock said at least one of the top wall and bottom walls to the respective side wall, and the passageway adapted to allow the key member to pass therethrough when the key member is aligned with the passageway to thereby unlock said at least one of the top wall and bottom walls from the respective side wall.

16. The link of claim 14 wherein the top and bottom walls are identical.

17. The link of claim 14 wherein the side walls are identical.

18. The link of claim 14 wherein each side wall includes an internally located, longitudinally extending reinforcing member at respective longitudinally opposed ends of which said pivot connectors are provided.

19. The link of claim 14 wherein the side walls each have an inner surface and the top and bottom walls each comprise a pair of curved corner features to provide a smooth transition to the inner surface of the respective side walls.

20. The link of claim 14 wherein each chain link comprises a pair of said key members.

21. The link of claim 20 wherein each key member passes through a side wall and the dovetail interconnection between that side wall and each of the top and bottom walls.

22. The link of claim 18 wherein each said longitudinally extending reinforcing member comprises a pair of sub-members in back-to-back configuration, a first portion of the reinforcing member having said sub-members engaging each other and a second portion having the sub-members spaced apart and parallel.

23. The link of claim 22 wherein the top and bottom walls are secured to their respective side walls by means of a pivotable key member passing between the spaced apart portions of the reinforcing member sub-members.

24. The link of claim 20 wherein each pivotable key member has an exposed end associated with a recess in the respective top or bottom wall and a longitudinally extending portion.

25. The link of claim 24 wherein the exposed portions of the key members each include a bent-over portion extending substantially normally from the longitudinal extending portion of the key member.

26. The link of claim 25 and a locking tool adapted to fit over the bent-over portion of the respective key members so as to reorientate the key members into one of several orientations, a first of which releases the top wall and bottom wall from the respective side wall, a second of which locks the top and bottom walls to the respective side wall, and a third of which locks one of the top or bottom wall and unlocks the other of the bottom or top wall from the respective side wall.

27. The link of claim 16 wherein the side walls are identical.

28. A link for a chain for carrying hose or cable, comprising:
a top wall,
a bottom wall,
a pair of side walls fixed to respective opposed lateral ends of the top and bottom walls to define a cable/hose receiving passage bound by all four walls, each side wall having a pair of pivot connectors at respective longitudinal ends thereof for articulated interconnection of the link with an adjoining link of the chain,
wherein at least one of the top and bottom walls can be detached from the side walls in a direction away from each other to provide access to said cable/hose receiving passage, and
wherein said at least one of the top and bottom walls includes an outer surface and is releasably secured to their respective side walls by means of a pair of pivotable key members, each key member having an exposed end associated with an access recess in the outer surface of the respective top or bottom wall and a longitudinally extending portion.

29. The link of claim 28 wherein said access recess has a passageway therein that extends through said at least one of the top and bottom walls, the passageway adapted to retain the respective key member in the access recess when the respective key member is misaligned with the passageway to thereby lock said at least one of the top wall and bottom walls to the respective side wall, and the passageway adapted to allow the respective key member to pass therethrough when the respective key member is aligned with the passageway to thereby unlock said at least one of the top wall and bottom walls from the respective side wall.

30. The link of claim 28 wherein the top and bottom walls are identical.

31. The link of claim 28 wherein the side walls are identical.

32. The link of claim 28 wherein each side wall includes an internally located, longitudinally extending reinforcing member at respective longitudinally opposed ends of which said pivot connectors are provided.

33. The link of claim 28 wherein the side walls each have an inner surface and the top and bottom walls each comprise a pair of curved corner features to provide a smooth transition to the inner surface of the respective side walls.

34. The link of claim 28 wherein said bottom and top walls are attached to the respective side walls by dovetail interconnection means.

35. The link of claim 34 wherein each key member passes through a side wall and the dovetail interconnection between that side wall and each of the top and bottom walls.

36. The link of claim 32 wherein each said longitudinally extending reinforcing member comprise a pair of sub-members in back-to-back configuration, a first portion of the reinforcing member having said sub-members engaging each other and a second portion having the sub-members spaced apart and parallel.

37. The link of claim 36 wherein the top and bottom walls are secured to their respective side walls by means of a pivotable key member passing between the spaced apart portions of the reinforcing member sub-members.

38. The link of claim 28 wherein each pivotable key member has an exposed end associated with the access recess in the respective top or bottom wall and a longitudinally extending portion.

39. The link of claim 38 wherein the exposed portions of the key members each include a bent-over portion extending substantially normally from the longitudinal extending portion of the key member.

40. The link of claim 39 and a locking tool adapted to fit over the bent-over portion of the respective key embers so as to reorientate the key members into one of several orientations, a first of which releases the top wall and bottom wall from the respective side wall, a second of which locks the top and bottom walls to the respective side wall, and a third of which locks one of the top or bottom wall and unlocks the other of the bottom or top wall from the respective side wall.

41. A link for a chain for carrying hose or cable, comprising;
a top wall,
a bottom wall,
a pair of side walls fixed to respective opposed lateral ends of the top and bottom walls to define a cable/hose receiving passage bound by all four walls, each side wall having a pair of pivot connectors at respective longitudinal ends thereof for articulated interconnection of the link with an adjoining link of the chain,
wherein at least one of the top and bottom walls can be detached from the side walls in a direction away from each other to provide access to said cable/hose receiving passage, and
wherein said at least one of the top and bottom walls is releasably secured to their respective side walls by means of a pivotable key member;
each side wall includes an internally located, longitudinally extending reinforcing member at respective longitudinally opposed ends of which said pivot connectors are provided,
each said longitudinally extending reinforcing member comprises a pair of sub-members in back-to-back configuration, a first portion of the reinforcing member having said sub-members engaging each other and a second portion having the sub-members spaced apart and parallel, and
the top and bottom walls are secured to their respective side walls by means of the pivotable key member which passes between the spaced apart portions of the reinforcing member sub-members.

42. The link of claim 41 wherein said at least one of the top and bottom walls includes an outer surface with an access recess, said access recess having a passageway therein that extends through said at least one of the top and bottom walls, the passageway adapted to retain the key member in the access recess when the key member is misaligned with the passageway to thereby lock said at least one of the top wall and bottom walls to the respective side wall, and the passageway adapted to allow the key member to pass therethrough when the key member is aligned with the passageway to thereby unlock said at least one of the top wall and bottom walls from the respective side wall.

* * * * *